United States Patent
Krueger et al.

(10) Patent No.: US 12,191,740 B2
(45) Date of Patent: Jan. 7, 2025

(54) DRIVE DEVICE FOR AN ACTUATOR

(71) Applicant: Robert Bosch GmbH, Stuttgart (DE)

(72) Inventors: Andreas Krueger, Buehl (DE); Benjamin Haufe, Obersulm Willsbach (DE); Konstantin Haberkorn, Stuttgart (DE); Vincent Fix, Herrlisheim (FR)

(73) Assignee: ROBERT BOSCH GMBH, Stuttgart (DE)

( * ) Notice: Subject to any disclaimer, the term of this patent is extended or adjusted under 35 U.S.C. 154(b) by 205 days.

(21) Appl. No.: 17/799,158

(22) PCT Filed: Mar. 3, 2021

(86) PCT No.: PCT/EP2021/055310
§ 371 (c)(1),
(2) Date: Aug. 11, 2022

(87) PCT Pub. No.: WO2021/180538
PCT Pub. Date: Sep. 16, 2021

(65) Prior Publication Data
US 2023/0163660 A1    May 25, 2023

(30) Foreign Application Priority Data
Mar. 13, 2020 (DE) .................. 10 2020 203 279.3

(51) Int. Cl.
*H02K 5/15* (2006.01)
*F16D 65/14* (2006.01)
*H02K 5/16* (2006.01)

(52) U.S. Cl.
CPC .............. *H02K 5/15* (2013.01); *F16D 65/14* (2013.01); *H02K 5/16* (2013.01)

(58) Field of Classification Search
None
See application file for complete search history.

(56) References Cited

U.S. PATENT DOCUMENTS

| 2004/0145261 A1* | 7/2004 | Ganter ................. H02K 29/12 |
| | | 310/91 |
| 2012/0019080 A1 | 1/2012 | Kottmyer et al. |

(Continued)

FOREIGN PATENT DOCUMENTS

| DE | 102007025838 A1 | 4/2008 |
| DE | 102009001948 A1 | 9/2010 |
| JP | 2019068603 A | 4/2019 |

OTHER PUBLICATIONS

International Search Report for PCT/EP2021/055310, Issued May 14, 2021.

*Primary Examiner* — Bernard Rojas
(74) *Attorney, Agent, or Firm* — NORTON ROSE FULBRIGHT US LLP; Gerard A. Messina

(57) ABSTRACT

A drive device for an actuator for a brake device of a motor vehicle. The drive device has an electric machine having a rotor rotatably mounted in a housing and a stator fixed to the housing. A bearing shield is situated in the housing that has an axially extending sleeve-shaped bearing segment for the rotatable bearing of a drive shaft, which bears the rotor. The bearing shield has an axially extending sleeve-shaped retaining segment held with a frictional fit in a sleeve-shaped end segment of the housing and has a diameter that is greater than the diameter of the bearing segment. A radially extending annular disk-shaped floor segment of the bearing shield is between the retaining segment and the bearing segment. The retaining segment has a first axial partial segment connected to the floor segment, and a second partial segment connected to the first partial segment.

11 Claims, 2 Drawing Sheets

(56) References Cited

U.S. PATENT DOCUMENTS

2014/0368063 A1* 12/2014 Furubayashi ............ H02K 7/08
                                                                  310/43
2016/0294249 A1* 10/2016 Keller .................... B23K 26/28
2021/0273511 A1*  9/2021 Takahashi ............ H02K 1/2791

* cited by examiner

DRIVE DEVICE FOR AN ACTUATOR

FIELD

The present invention relates to a drive device for an actuator, in particular for a brake device, having an electric machine that has a rotor rotatably mounted in a housing and a stator fixed to the housing, having a bearing shield situated in the housing that has at least one radially extending sleeve-shaped bearing segment for the rotatable bearing of a drive shaft, which bears the rotor, of the electric machine, the bearing shield having an axially extending sleeve-shaped retaining segment that is held with a frictional fit in a sleeve-shaped end segment of the housing and has a diameter that is greater than the diameter of the bearing segment, at least one radially extending annular disk-shaped base segment of the bearing shield being fashioned between the retaining segment and the bearing segment.

BACKGROUND INFORMATION

Drive devices of the type mentioned above are available in the related art. In order to mount the drive shaft of a rotor of an electric machine in a housing, it is conventional to situate one or more bearing shields in the housing that are made separately from the housing and are fastened in the housing. In this way, a simple assembly of the electric machine is ensured. For example, in this way the housing of the electric machine is made with a cup shape and is closed at its open side by a bearing shield that has at least one bearing segment in which the drive shaft is rotatably mounted. Here, in the bearing segment a pivot bearing is standardly situated, for example a roller bearing, magnet bearing, or the like, that acts between the drive shaft and the bearing shield. The roller bearing is oriented and held axially and radially on or by the bearing shield. For this purpose, conventional bearing shields have a sleeve-shaped bearing segment in which the roller bearing can for example be axially inserted. In addition, such bearing shields have a further sleeve-shaped segment that, as retaining segment, aligns, orients, and possibly also holds the bearing shield in the housing. Here it is conventional in particular to hold the bearing segment in the housing through a press fit, in particular in a sleeve-shaped end segment of the housing. The press fit can be realized by pressing the bearing shield into the housing or by shrinking the housing onto the bearing shield.

SUMMARY

A drive device according to the present invention may have an advantage that the bearing shield is not impaired in its orientation by being pressed into the housing or by the shrinking of the housing onto the bearing shield. An advantageous shaping of the retaining segment of the bearing shield brings it about that the orientation in particular of the annular disk-shaped floor segment of the bearing shield situated between the bearing shield and the retaining segment remains within narrow tolerances, so that misalignments in particular of the roller bearing are reliably prevented. According to the an example embodiment of the present invention, this is brought about in that the retaining segment has a first axial partial segment connected to the floor segment, having a first outer diameter, and a second partial segment connected to the first partial segment, having a second outer diameter, the second outer diameter being larger than the first outer diameter. In this way, it is brought about that the partial segment of the bearing shield situated further from the floor segment has a larger outer diameter, and that in this way the bearing point of the bearing shield on the end segment of the housing of the electric machine is also situated at a distance from the floor segment of the bearing shield, at least by the first partial segment. As a result, the occurrent radial press forces are applied to the bearing shield at a distance from the floor segment, and as a result these forces act in a region that has a smaller influence on the orientation in particular of the floor segment and of the bearing segment relative to the drive shaft of the electric machine. The advantageous choice of diameter ensures that during the pressing process, or during the installation of the drive device, in particular a pivoting of the floor segment out of a plane that is perpendicular to the axis of rotation of the drive shaft is reliably prevented.

Preferably, the end segment of the housing is axially at least as long as the retaining segment of the bearing shield, so that the bearing shield can be inserted completely into the end segment of the housing and arrested or fixed there.

In addition, it is preferably provided that the end segment of the housing has a continuously constant inner diameter. In this way, it is ensured that the housing, in the end segment, interacts only with the second partial segment of the retaining segment of the bearing shield, and thus no forces are radially transmitted onto the bearing shield in the vicinity of the floor segment onto the bearing shield.

According to an example embodiment of the present invention, preferably, the retaining segment of the bearing shield has a continuously constant or nearly constant radial extension. This means that in the retaining segment the bearing shield has a constant thickness, and thus in particular is easy to manufacture as a deep-drawn part. In addition, this means that, along with the outer diameter, the inner diameter also increases from the first partial segment into the second partial segment.

According to an example embodiment of the present invention, preferably, the second partial segment extends up to a free end face of the bearing shield. In this way, the retaining segment as a whole is formed only by the first and the second partial segment, the second partial segment, used for seating on the end segment of the housing, forming the end segment of the bearing shield. In this way, a secure and desired seating of the bearing shield on the inner side of the end segment of the housing is reliably ensured.

According to an example embodiment of the present invention, preferably, the free end face of the bearing shield is situated axially at the height of a free end of the end segment of the housing. As result, the end of the bearing shield and the end of the housing align with one another, so that the axial constructive length of the drive device as a whole is at least substantially limited to the axial extension of the housing.

According to an example embodiment of the present invention, particularly preferably, at the free end of the end segment of the housing there is situated a radially outward-protruding attachment flange, in the form of a collar, for fastening the housing to the actuator. The attachment flange is thus formed on the housing, and is at least substantially aligned with the end of the bearing shield. In this way, the contact surface between the bearing shield and the housing is maximized. In addition, a simple assembly of the drive device on a consumer, in particular on the actuator named above, is ensured by the attachment flange.

In addition, it is preferably provided that the attachment flange is made in one piece with the housing, in particular as a collar. In this way, a low-cost production of the drive device and in particular of the housing is ensured.

According to an example embodiment of the present invention, preferably, the end face of the bearing shield terminates flush with an end surface, assigned to the actuator, of the mounting flange. In this way, both the bearing shield and also the mounting flange can lie on the actuator, for example on a housing of the actuator, thus bringing about an advantageous seal.

According to an example embodiment of the present invention, particularly preferably, a sealing element is provided, in particular a silicon sealing element, that extends over at least some regions of, respectively, the end face of the bearing shield and the end surface of the attachment flange, so that the sealing element lies both on the bearing shield and also on the housing, or on the mounting flange of the housing. In this way, the sealing element extends over the bearing shield and mounting flange, so that a particularly tight connection is achieved on the one hand between the bearing shield and the housing and on the other hand between the drive device and the actuator to which the drive device is to be attached or is attached.

In the following, the present invention is explained in more detail on the basis of the figures.

DETAILED DESCRIPTION OF EXAMPLE EMBODIMENTS

Figure 1:
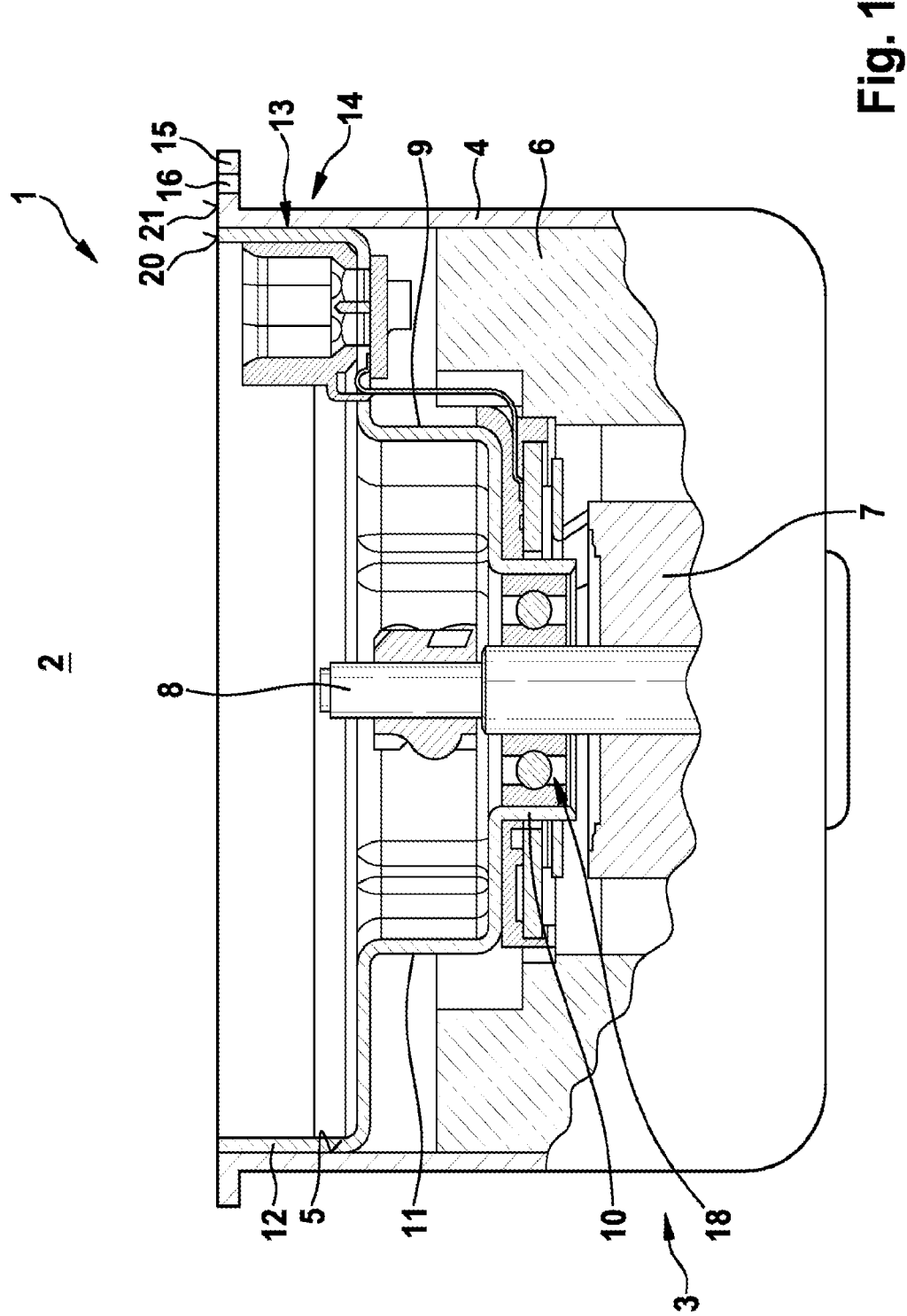
FIG. 1 shows an advantageous drive device in a simplified longitudinal sectional view, according to an example embodiment of the present invention.
Figure 2:
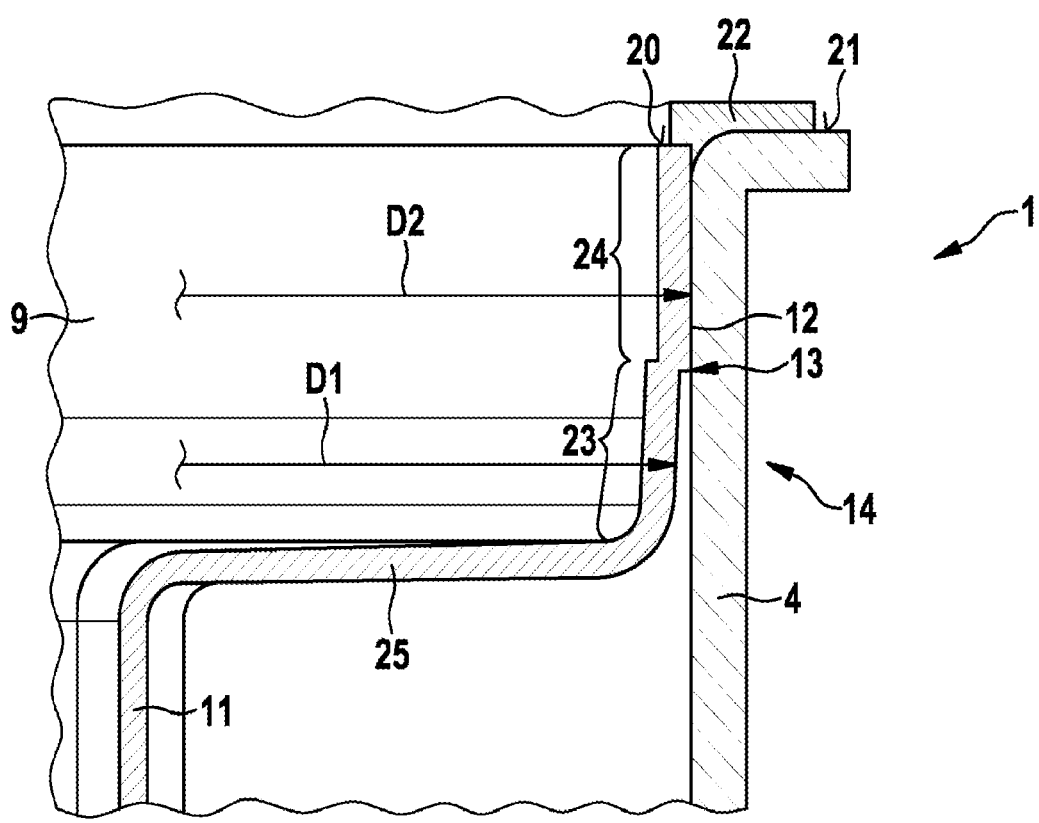
FIG. 2 shows an enlarged detail of the drive device, according to an example embodiment of the present invention.

FIG. 1 shows, in a simplified longitudinal sectional view, an advantageous drive device 1 for an actuator 2 or consumer (not shown) that is capable of being driven by the drive device. For this purpose, drive device 1 has an electric machine 3 situated in a housing 4. Housing 4 is made substantially cup-shaped, and has a receptacle opening 5 at an end face. Electric machine 3 has a stator 6 situated fixedly in housing 4, and has a rotor 7 assigned to stator 6. Rotor 7 is situated on a drive shaft 8 that is mounted rotatably in housing 4. In particular, drive shaft 8 is rotatably mounted by two or more roller bearings 18. One of the roller bearings 18, shown in the Figure, is situated on a bearing shield 9 that is largely situated inside housing 4. While, according to the present exemplary embodiment, a roller bearing 18 is shown and described, according to another exemplary embodiment the mounting of drive shaft 8 in bearing shield 9 can alternatively be provided by some other type of pivot bearing, such as a magnet bearing, hydraulic bearing, pneumatic bearing, or friction bearing.

Bearing shield 9 is made of metal as a deep-drawn part, and has a sleeve-shaped first segment 10 that acts as bearing segment for accommodating and situating the above-named roller bearing 18, and has a second segment 11 and a third segment 12, the segments 10 to 12 differing in that segment 10 has a first diameter D1 that is smaller than a diameter D2 of second segment 11, and third segment 12 having a diameter D3 that is larger than diameter D2. The segments succeed one another axially in the indicated sequence 10, 11, 12. Second segment 11 is used in particular to accommodate a drive (not shown), in particular a planetary drive, which is used to translate rotational speed and/or torque at consumer 2.

Third segment 12 forms a retaining segment 13 by which bearing shield 9 is held in housing 4 of electric machine 3. Housing 4 has an end segment 14 that forms opening 5. End segment 14, and thus also opening 5, have an inner diameter that is slightly smaller than an outer diameter of retaining segment 12 of bearing shield 9, so that there is a radial press fit between bearing shield 9 and housing 4 in the area of retaining segment 13 and end segment 14, by which press fit bearing shield 9 is fastened in housing 4. Here, end segment 14 has an axial length that is at least as long as the axial length of segment 12, or of retaining segment 13, of bearing shield 9, so that this shield can be situated partially or completely in housing 4.

Moreover, housing 4 has, at the free end of end segment 14, a radially outward-protruding collar in the form of a mounting flange 15. Mounting flange 15 stands out radially from housing 4 and forms mounting flange 15 of drive device 1. For this purpose, mounting flange 15 has for example openings 16 distributed uniformly around its circumference, of which only one is shown in the Figure, through which fastening screws can be used to assemble drive device 1 to consumer 2. Drive device 1 is thus capable of being situated, or fastened, as a whole on consumer 2 using mounting flange 15 of bearing shield 9.

As can be seen in FIG. 1, the bearing shield terminates, with retaining segment 13, flush with mounting flange 15 of housing 4, so that a free end face 20 of retaining segment 13 is situated flush with an end surface 21 of housing 4 on mounting flange 15. Optionally, a sealing element, in particular a silicon sealing element 22, is provided that lies on the end face of drive device 1 in such a way that it extends at least over regions both of end face 20 and also of end surface 21, so that a particularly tight connection is ensured between bearing shield 9 and housing 4, and in addition a tight connection is also provided between drive device 1 on the one hand and consumer 2, on which mounting flange 15 is to be situated, on the other hand.

Retaining segment 13 of bearing shield 9 has a first partial segment 23 and a second partial segment 24 that extend one after the other axially from an annular disk-shaped floor segment 25 that extends substantially radially between segment 11 and retaining segment 13. Here, first partial segment 23 goes out from floor segment 25, i.e. substantially stands out in perpendicular or axial fashion therefrom, and partial segment 24 connects to partial segment 23, and ends in end face 20.

The two partial segments 23, 24 differ in that the outer diameter of partial segment 24 is greater than the outer diameter of partial segment 23, so that the press fit between housing 4 and bearing shield 9 exists only in the region of second partial segment 24. As a result, the contact point between housing 4 and bearing shield 9 is at a distance from floor segment 25. As a result, in the region of partial segment 23 preferably no, or only small, radial forces, which could also act on floor segment 25, are transmitted to bearing shield 9.

Here, the advantageous realization of drive device 1 brings it about that through the shrinking of housing 4 onto bearing shield 9 in the region of partial segment 24, no forces act on bearing shield 9 in such a way that the orientation of floor segment 25 is moved out of a plane perpendicular to the axis of rotation of drive shaft 8. Thus, using simple means, it is ensured that a misalignment in particular of the bearing segment (segment 10) is prevented.

In addition, there results a simplified geometry of housing 4, having an inner diameter that remains the same, or constant, at least in end segment 14. If housing 4 is realized as a deep-drawn part, the deep-drawing tool can thus make do with fewer drawing stages, thus achieving a simplified manufacture.

Moreover, the overall large axial length of retaining segment 13 also brings about a large radial sealing surface between bearing shield 9 and housing 4.

What is claimed is:

1. A drive device for an actuator, comprising:
an electric machine including:
   a rotor rotatably mounted in a housing;
   a stator fixed to the housing; and
   a bearing shield situated in the housing that has at least one axially extending sleeve-shaped bearing segment for a rotatable bearing of a drive shaft, which bears the rotor of the electric machine, the bearing shield having an axially extending sleeve-shaped retaining segment that is held with a frictional fit in a sleeve-shaped end segment of the housing and that has a diameter that is greater than a diameter of the bearing segment, at least one radially extending and annular disk-shaped floor segment of the bearing shield being formed between the retaining segment and the bearing segment;
wherein the retaining segment has a first axial partial segment, connected to the floor segment, having a first outer diameter, and a second partial segment, connected to the first partial segment, having a second outer diameter, the second outer diameter being larger than the first outer diameter, wherein the floor segment is coplanar with a plane that is perpendicular to an axis of rotation of the drive shaft, and wherein the floor segment is maintained coplanar with the plane on account of the frictional fit being between the second partial segment and the sleeve-shaped end segment of the housing and not between the first partial segment and the sleeve-shaped end segment of the housing.

2. The drive device as recited in claim 1, wherein the drive device is for a brake device of a motor vehicle.

3. The drive device as recited in claim 1, wherein the end segment of the housing is axially at least as long as the retaining segment of the bearing shield.

4. The drive device as recited in claim 1, wherein the end segment of the housing has a continuously constant inner diameter.

5. The drive device as recited in claim 1, wherein the retaining segment of the bearing shield has a continuously constant radial extension.

6. The drive device as recited in claim 1, wherein the second partial segment extends up to a free end face of the bearing shield.

7. The drive device as recited in claim 6, wherein the free end face of the bearing shield is situated axially at the height of a free end of the end segment of the housing.

8. The drive device as recited in claim 7, wherein a radially outward-protruding mounting flange for fastening the housing to the actuator is situated on the free end of the end segment of the housing.

9. The drive device as recited in claim 8, wherein the mounting flange is a collar made in one piece with the housing.

10. The drive device as recited in claim 8, wherein the end face of the bearing shield terminates flush with an end face, assigned to the actuator, of the mounting flange.

11. The drive device as recited in claim 8, wherein a silicon sealing element, extends over at least regions of, respectively, the end face of the bearing shield and an end surface of the mounting flange.

* * * * *